United States Patent
McLaughlin et al.

(10) Patent No.: US 9,911,182 B2
(45) Date of Patent: *Mar. 6, 2018

(54) SYSTEMS AND METHODS FOR SELECTIVE ENHANCEMENT OF A REGION OF INTEREST IN AN IMAGE

(71) Applicant: SHENZHEN MINDRAY BIO-MEDICAL ELECTRONICS CO., LTD., Shenzhen (CN)

(72) Inventors: Glen W. McLaughlin, San Carlos, CA (US); Ludwig Steffgen, Mainleus (DE)

(73) Assignee: SHENZHEN MINDRAY BIO-MEDICAL ELECTRONICS CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,036

(22) Filed: Oct. 3, 2016

(65) Prior Publication Data

US 2017/0091915 A1    Mar. 30, 2017

Related U.S. Application Data

(63) Continuation of application No. 14/292,477, filed on May 30, 2014, now Pat. No. 9,460,499.

(51) Int. Cl.
*G06K 9/00* (2006.01)
*G06T 5/00* (2006.01)
(Continued)

(52) U.S. Cl.
CPC ............... *G06T 5/008* (2013.01); *G06T 3/40* (2013.01); *G06T 3/4092* (2013.01); *G06T 5/009* (2013.01);
(Continued)

(58) Field of Classification Search
CPC .... A61B 8/00; A61B 8/08; A61B 8/06; A61B 8/14; A61B 8/488; A61B 8/5207;
(Continued)

(56) References Cited

U.S. PATENT DOCUMENTS 6,262,749 B1 * 7/2001 Finger ................. G01S 7/52023
128/916
2006/0079780 A1 * 4/2006 Karasawa ................ A61B 8/08
600/447

(Continued)

FOREIGN PATENT DOCUMENTS

WO    WO 96/009002    3/1996
WO    WO 2000/040998    7/2000

OTHER PUBLICATIONS

International Search Report and Written Opinion by the International Searching Authority, dated Aug. 28, 2015, 8 pages, for the corresponding International Application PCT/US2015/033246.

*Primary Examiner* — Amara Abdi
(74) *Attorney, Agent, or Firm* — Kory D. Christensen; Polsinelli LLP

(57) ABSTRACT

The present disclosure provides systems and methods for receiving ultrasound image data corresponding to an ultrasound image with a master dynamic range and displaying a globally tone-mapped version of the ultrasound image on an electronic display. A region of interest (ROI) within the ultrasound image may be regionally tone mapped to provide an enhanced, optimized, and/or otherwise improved image of the ROI. The regional tone mapping may allow for features within the ROI to be more easily distinguishable that are not or at least not easily distinguishable in the global tone mapping of the same region.

27 Claims, 15 Drawing Sheets

(51) Int. Cl.
*G06T 5/40* (2006.01)
*G06T 5/50* (2006.01)
*G06T 3/40* (2006.01)

(52) U.S. Cl.
CPC .................. *G06T 5/40* (2013.01); *G06T 5/50* (2013.01); *G06T 2207/10132* (2013.01); *G06T 2207/20012* (2013.01); *G06T 2207/20104* (2013.01); *G06T 2207/20208* (2013.01); *G06T 2207/20221* (2013.01); *G06T 2207/30056* (2013.01); *G06T 2207/30084* (2013.01); *G06T 2207/30101* (2013.01)

(58) Field of Classification Search
CPC ........... A61B 8/13; A61B 8/483; A61B 6/463; A61B 8/463; A61B 8/481; G06T 7/0012; G06T 11/00; G06T 2207/30004; G06T 5/008; G06T 5/009; G06T 5/40; G06T 5/50; G06T 3/40; G06T 3/4092; G06T 2207/10132; G06T 2207/20012; G06T 2207/20208; G06T 2207/20221; G06T 2207/20104; G06T 2207/30101; G06T 2207/30084; G06T 2207/30056; Y10S 128/916
See application file for complete search history.

(56) References Cited

U.S. PATENT DOCUMENTS

| | | | |
|---|---|---|---|
| 2008/0071174 A1* | 3/2008 | Waki | A61B 8/08 600/442 |
| 2008/0131016 A1* | 6/2008 | Kokemohr | G06T 5/009 382/254 |
| 2009/0018447 A1* | 1/2009 | Willsie | G01S 7/52071 600/443 |
| 2009/0041375 A1* | 2/2009 | Cohen | G06T 5/007 382/274 |
| 2010/0157078 A1* | 6/2010 | Atanassov | G06T 5/007 348/222.1 |
| 2010/0160781 A1* | 6/2010 | Carter | A61B 8/06 600/439 |
| 2010/0179427 A1* | 7/2010 | Yamamoto | A61B 8/00 600/443 |
| 2011/0188744 A1* | 8/2011 | Sun | G06T 5/50 382/162 |
| 2011/0285737 A1* | 11/2011 | Lin | G09G 5/10 345/589 |
| 2012/0081566 A1* | 4/2012 | Cote | H04N 5/2256 348/222.1 |
| 2014/0093150 A1* | 4/2014 | Zalev | G06T 7/0012 382/131 |

* cited by examiner

SYSTEMS AND METHODS FOR SELECTIVE ENHANCEMENT OF A REGION OF INTEREST IN AN IMAGE

TECHNICAL FIELD

This disclosure relates to systems and methods for viewing and enhancing ultrasound images. Specifically, this disclosure provides systems and methods for enhancing a region of interest in an ultrasound.

SUMMARY

In various embodiments, a received ultrasound image may have a relatively high dynamic range. An electronic display may have a lower dynamic range. Accordingly, it may be useful to generate a mapping of the available grayscale levels of a master ultrasound image to the number of grayscale levels displayable on an electronic display. Such tone mapping or encoding of grayscale levels may be done linearly or non-linearly.

In various embodiments, the loss of grayscale resolution may make it difficult for a user to distinguish between various features of an ultrasound image. Various embodiments of the systems and methods described herein allow a user to select a portion of the master ultrasound image, a region of interest (ROI) for regional tone mapping. The ROI may be displayed as an overlay over the globally tone-mapped image, as a replacement to the globally tone-mapped image, or as a stand-alone image. In some embodiments, the overlaid image may be slightly enlarged (magnified) and/or accentuated (e.g., a bold border around the region or the like).

In various embodiments, the regional tone mapping of the ROI may include tone mapping the ROI of the master ultrasound image to a larger number of grayscale levels than were used in the global tone mapping of the same region.

In some embodiments, the regional tone mapping of the ROI may differ from the global tone mapping of the same region by using a different linear mapping function, gamma compression algorithm, gradient domain high dynamic range compression algorithm, gamma algorithm, logarithmic algorithm, histogram equalization algorithm, regional tone mapping algorithm, decomposition of the image, gradients of images, inverse tone mapping algorithm, inverse linearization algorithm, and/or image color appearance model (iCAM).

Thus, the presently described systems and methods may include: receiving, via a processor, ultrasound image data corresponding to an ultrasound image with a master dynamic range; generating a global tone mapping of the ultrasound image data to a displayable dynamic range that is less than the master dynamic range of the ultrasound image; receiving, via an electronic input device, information identifying a selected region of the ultrasound image for regional tone mapping; and generating a regional tone mapping of a subset of the ultrasound image data corresponding to the selected region to a displayable dynamic range, where the regional tone mapping of the selected region of the ultrasound image is different from the global tone mapping of the selected region of the ultrasound image.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
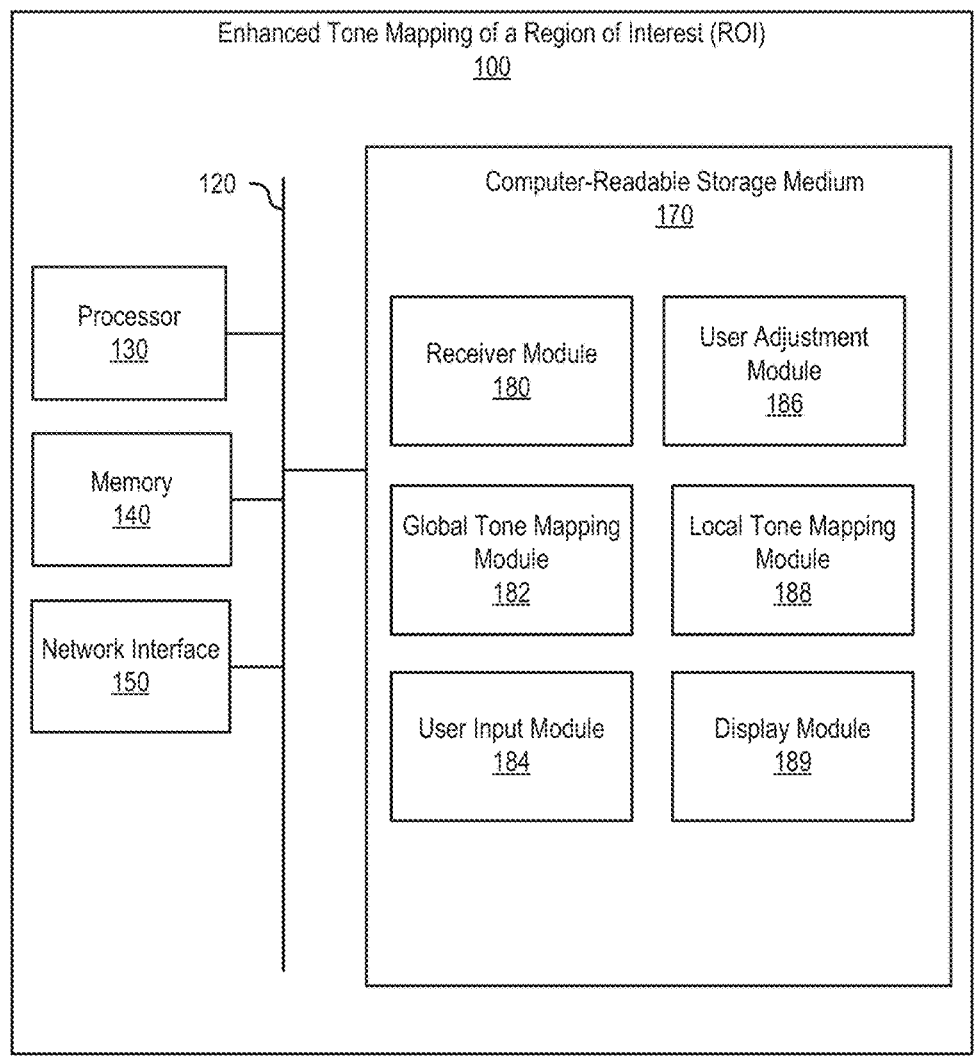
FIG. 1 is a block diagram of a computer system for displaying an enhanced or regional tone mapping of a selected region of interest (ROI).

This disclosure includes various embodiments of systems and methods for enhancing a region of interest (ROI) of an ultrasound image. It is appreciated that various embodiments of this disclosure may be applicable to other image types, imaging systems, and/or image display systems or methods. For instance, the embodiments described herein may be applicable to x-ray images, computed tomography (CT) images, and other modalities of medical images. Moreover, various embodiments used herein refer to grayscale images and grayscale tone mapping. In is appreciated that color images and color tonal mappings may be substituted in many such embodiments.

Ultrasound imaging is a technology that is able to produce real-time high resolution, and high dynamic range images of soft tissue structures. Unfortunately, in order to represent the images accurately, a number of local compromises may be made that have the potential to reduce the diagnostic information contained within each image.

In various embodiments, a system (e.g., a processor of a system) may receive ultrasound image data having a relatively high dynamic range. For example, the system may receive an ultrasonic image with a dynamic range of approximately 84-108 decibels (84-100 dB), the equivalent of between approximately 16,000 grayscale levels and 262,000 grayscale levels. Such images may be captured using a digital imaging device with 14-18 bits per pixel. It is appreciated that the presently described embodiments may also be applicable to higher (or lower) dynamic ranges—whether measured or referred to in dB, grayscale levels, or bits per pixel.

While the dynamic range of the ultrasound image data may be relatively high, a typical 8-bit electronic display may only be able to accurately represent 256 shades of gray (around 48 dB). Moreover, the human visual system in ideal lighting conditions might be able to discern around 1,024 variations of gray (60 dB), but this may be reduced to as few as 64 shades of gray (around 32 dB) in typical lighting conditions.

Accordingly, it may be useful to generate a mapping of the 260,000+ grayscale levels of a master ultrasound image to the number of grayscale levels displayable on an electronic display (between 256 or an 8-bit display and 1024 for a 10-bit display). In most cases, the dynamic range of the electronic display is less than the dynamic range of the master ultrasound image.

As described above, the master dynamic range of an ultrasound image may exceed the displayable dynamic range of an electronic display. Accordingly, the master dynamic range spectrum (e.g., a spectrum of grayscale levels from 0 to 262,143 for an 18-bit image) may be globally tone mapped to a displayable dynamic range. This global tone mapping may be more or less compressive depending on the dynamic range of the master ultrasound image and the displayable dynamic range of the electronic display. Moreover, the tone mapping or encoding of grayscale levels may be done linearly or non-linearly.

As an example, a 16-bit ultrasound image (65,536 grayscale levels) may be globally tone mapped for an 8-bit display by linearly mapping 256 unique grayscale levels of the master ultrasound image to each displayable grayscale level on the 8-bit display. The dynamic range compression of the master ultrasound image may result in a significant loss of detail. For instance, objects that are similar (but discernibly different) shades of gray in the master ultrasound image may be mapped to the same (or indiscernibly different) shade of gray during the global tone mapping of the master ultrasound image to the displayable dynamic range. Such global mapping of an entire image may result in an unacceptable number of artifacts.

Images may be tone mapped non-linearly as well. For instance, a master ultrasound image that is relatively dark may be globally tone mapped with a higher number of displayable grayscale levels used for the darker portion of the master dynamic range. Similarly, a master ultrasound image that is relative light may be globally tone mapped with a higher number of displayable grayscale levels used for the lighter portion of the master dynamic range.

Whether the master image is mapped linearly or non-linearly, it is possible that the loss of grayscale resolution may make it difficult for a user (a human viewer, a computer viewer, or combination thereof) to distinguish between various features of an ultrasound image (or other image type as provided herein). Various embodiments of the systems and methods described herein allow a user to select a portion of the master ultrasound image, referred to herein as an ROI, for regional tone mapping.

The regional tone mapping systems and methods described herein may be provided for an ROI as an overlay over the globally tone-mapped image or in a stand-alone window. In some embodiments, the overlaid image may be slightly enlarged (magnified) and/or accentuated (e.g., a bold border around the region or the like).

In various embodiments, the regional tone mapping of the ROI may be different from the global tone mapping of the same ROI for the display of the entire ultrasound image. The regional tone mapping of the ROI may include tone mapping the ROI of the master ultrasound image to a larger number of grayscale levels than were used in the global tone mapping of the same region.

In some embodiments, the regional tone mapping of the ROI may differ from the global tone mapping of the same region in any of a wide variety of ways, including using a different: linear mapping function, gamma compression algorithm, gradient domain high dynamic range compression algorithm, gamma algorithm, logarithmic algorithm, histogram equalization algorithm, regional tone mapping algorithm, decomposition of the image, gradients of images, inverse tone mapping algorithm, inverse linearization algorithm, and/or image color appearance model (iCAM).

In various embodiments, the regional tone mapping of the ROI may ignore luminance values of the ultrasound image data that are above or below threshold values. The threshold values may be determined based on the dynamic range of the master ultrasound image and/or the displayable dynamic range of the electronic display.

Thus, an electronic system may be configured for displaying a globally tone-mapped ultrasound image. The system may include one or more input devices to allow a user to provide a selection of an ROI within the displayed ultrasound image. The electronic system may then generate a regional tone mapping of the ROI that is different from the global tone mapping of the same region and display the regional tone-mapped ROI as an overlay, in place of the originally displayed image, or as a stand-alone secondary image.

The regional tone mapping may provide for a tone mapping of the ROI with a higher dynamic range than was used for the same region in the global tone mapping. The regional tone mapping may also or alternatively include various other image adjustments as discussed herein, including image adjustments to the entire ROI or to select portions of the ROI. Such image adjustments include but are not limited to adjustments to the contrast, brightness, definition, sharpening, blurring, and/or other useful image adjustments.

In various embodiments, regional tone mapping based on the dynamic range of the ROI may include generating a histogram of the pixel intensities within the ROI and generating a function that takes the original pixel intensity value and maps it to a modified pixel intensity value based on the properties of the histogram of the ROI. The function can be as simple as a linear map of the lowest value pixel to the lowest intensity and the brightest pixel value to the maximum intensity and every pixel in between to a value that is a ratio of the value minus the minimum divided by the difference between the maximum and the minimum.

An alternative embodiment may include a variation of the example above, in which the system may "threshold out" some of the lowest level values and/or some of the maximum level values. In some embodiments, statistical outliers may be excluded from the regional mapping. In some embodiments, the system may account for the overall noise of the image. For instance, pixel values at or below a certain level may be automatically or manually marked as system level noise and may therefore be excluded from the regional mapping.

Similarly, especially bright regions may be caused by strong reflectors (e.g., a border between fluid and tissue, a mineral deposit, and/or the like). Such bright regions may all be considered above a threshold value and thus be mapped to a maximum grayscale value for the particular regional mapping. It is appreciated that any number of image processing or image mapping techniques and tools may be utilized to generate the reduced dynamic range mapping for the ROI, including various gamma curves, inverse linearization functions, etc.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general purpose computers, computer programming tools and techniques, computer networks and networking technologies, digital storage media, authentication, access control, and other security tools and techniques provided by public keys, encryption, firewalls, and/or other means.

The embodiments of the disclosure are described below with reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 is a block diagram of a computer system 100 for displaying an enhanced or regional tone mapping of a selected region of interest (ROI). As illustrated, a processor 130 may be in communication with a memory 140, a network interface 150, and/or a computer-readable storage medium 170 (e.g., a non-transitory computer readable storage medium) via a bus 120. The computer-readable storage medium may include one or more modules implemented in hardware, firmware, and/or software for generating an enhanced tone mapping of an ROI. In various embodiments, one or more of the illustrated modules may be removed and/or implemented by a different system at a later time or concurrently. In some embodiments, some of the method steps and/or modules may be omitted.

In various embodiments, a receiver module 180 may be configured to receive ultrasound image data corresponding to one or more ultrasound images. The received ultrasound images may have a master dynamic range that exceeds a displayable dynamic range of an associated electronic display. A global tone mapping module 182 may be configured to generate a global tone mapping of the ultrasound image data to a displayable dynamic range that is less than the master dynamic range and is suitable for display on an associated electronic display. The display module 189 may facilitate the display of the globally tone-mapped ultrasonic image.

A user input module 184 may be configured to receive a selection of an ROI on the displayed globally tone-mapped ultrasonic image. The ROI may be, for example, identified by the user using a cursor, a mouse, a keyboard, a touch screen or other input device. In various embodiments, a user adjustment module 186 may allow a user to specify one or more image enhancements, modifications, adjustments, processing techniques, and/or other change to be performed on the ROI. A regional tone mapping module 188 may be configured to generate a regional tone mapping of a subset of the ultrasound image date corresponding to the selected ROI. The regional tone mapping may perform a tone mapping for the selected ROI for display on the electronic display utilizing a different tone mapping from that used for the global tone mapping of the same region.

As previously described, one or more of the modules described herein may be omitted, combined with one or more other modules, and/or implemented separately.

Figure 2:
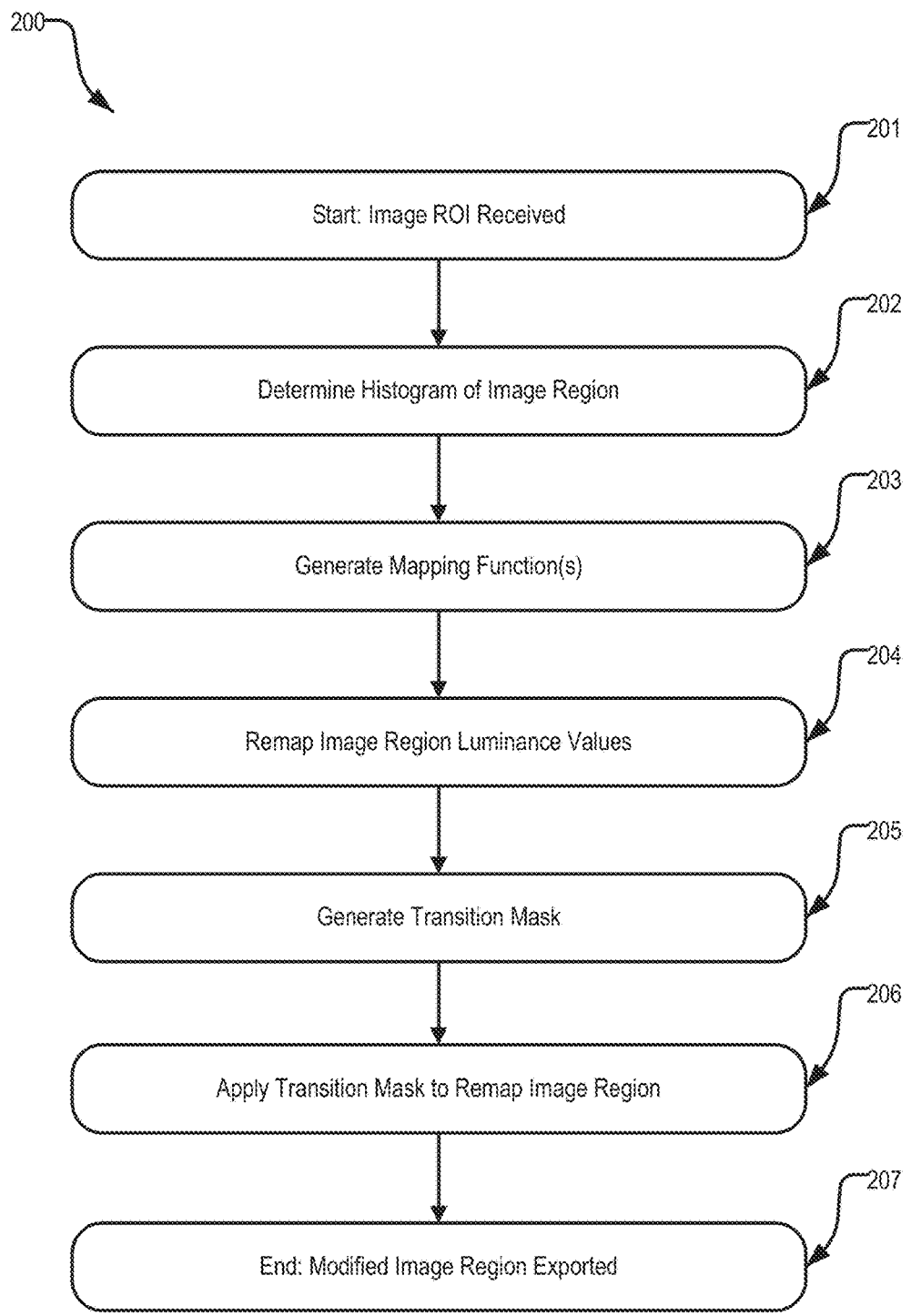
FIG. 2 illustrates a method of one embodiment for generating an ROI with a regional tone mapping.

FIG. 2 illustrates a method of one embodiment of a method 200 for generating an ROI with a regional tone mapping. The method 200 may be initiated when a user selects an ROI to be remapped (e.g., via a regional/enhanced tone mapping). In the illustrated embodiment for generating a regional tone mapping, the ROI is received, 201. A system may determine a histogram of the ROI, 202. The histogram may be based on the pixel values (e.g., grayscale/luminance values) and the count of pixels of the same value.

The histogram results may be sent to a mapping function(s) module, 203, which takes the information contained in the histogram and then (optionally based on the preferences selected by the user) creates a mapping function from the original pixel value to a modified/enhanced pixel value. The mapping functions, so generated, may be remapped, 204, to the pixel intensity (luminance values) for the region.

In various embodiments, the remapped pixels may have high levels of discontinuities within the imaging region. Accordingly, one or more smoothing or transition algorithms may be applied to the ROI. For instance, a transition mask, 205, of the ROI may be generated that provides a mask that can be used to smooth the transition. The transition mask may utilize, for example, a low-pass filter and/or an adaptive directional-based filter algorithm.

The transition mask may be applied to the remapped image region luminance values in a weighted manner by a transition mask module, 206. This module can be done based on user-selectable parameters. For instance, a user may select a percentage of the weight that should be applied to remap the ROI. The remapped ROI may then be exported, at 207, for display on an electronic display as a stand-alone image and/or as an overlay on the original image.

Figure 3:
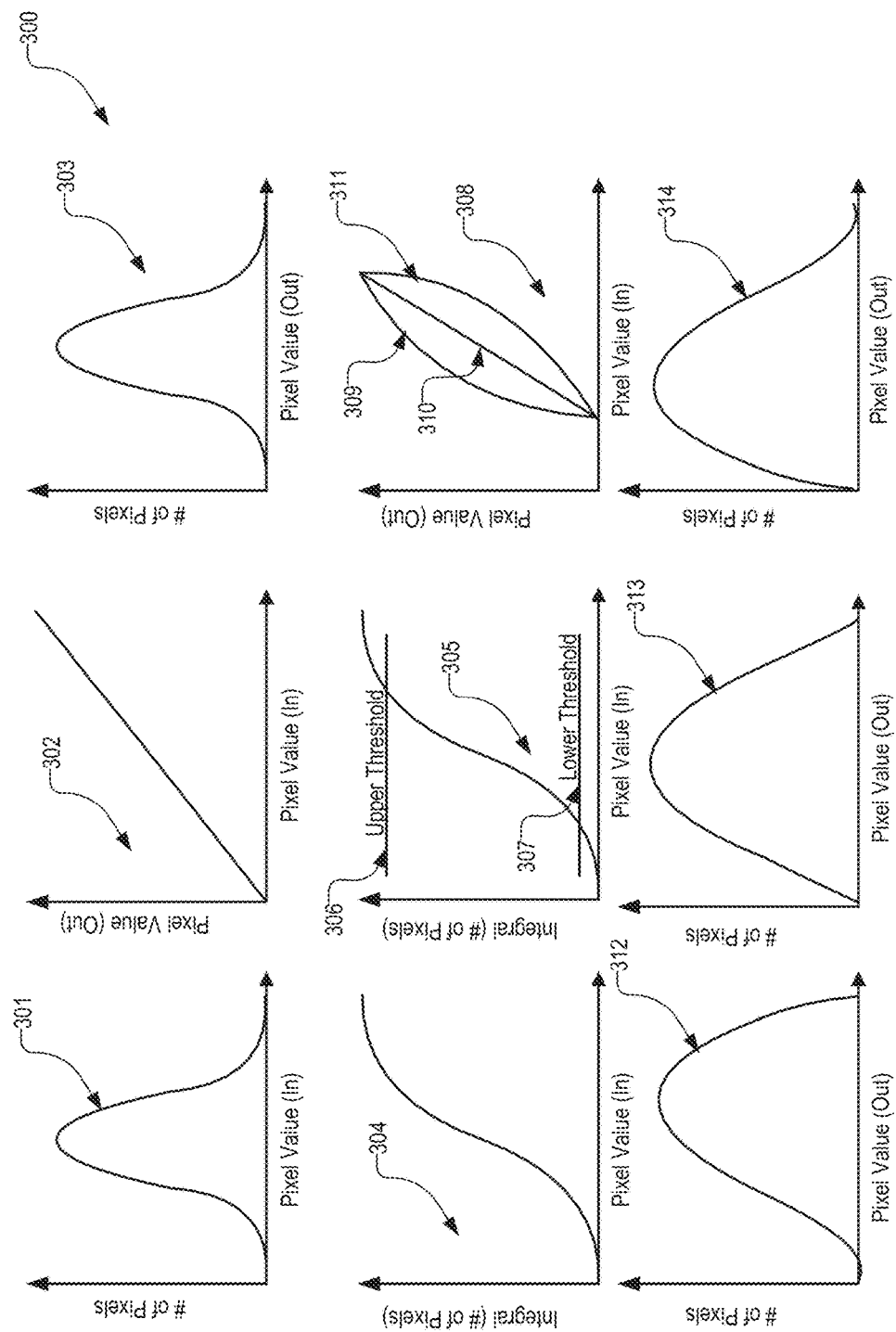
FIG. 3 is a set of graphical representations of various possible states and/or approaches to remapping the grayscale or luminance values from a master image for generating a regional tone mapping for a selected ROI.

FIG. 3 is a set of graphical representations 300 of various possible states and/or approaches to remapping the grayscale or luminance values from a master image for generating a regional tone mapping for a selected ROI. It is appreciated that any of a wide variety of image mapping algorithms and approaches may be utilized. For example, one approach not illustrated is an inverse function of the cumulative distribution to generate a linear mapping of the pixel density across the intensity region. Any of a wide variety of appropriate mapping functions may be applied to the input data set to produce a desired outcome or based on a set of defined properties.

The overall behavior of the automatic dynamic range optimization (i.e., regional/enhanced tone mapping) may vary based on user preference and imaging conditions. In order to maintain some continuity between images during a live scanning situation, the automatic optimization parameters and/or functional map (i.e., tone mapping) may be slowly varied based on user preference. This would result in a type of functional map persistence. During frozen images and ROI movements the functional map may adjust instantly to the selected ROI. In other embodiments, the functional map may slowly transition.

Given that users may have different preferences and opinions of how to optimize the overall diagnostic information contained within each imaging situation: cardiac, liver, kidney, breast, testicles, etc., along with user preference, the system may offer a variety of optimization target mapping functions for user selection. For instances, presents may be generated for each of a wide variety of clinical situations. In some embodiments, a user may have the ability to save a default setting and/or customize the presents. Such settings may apply to the globally tone-mapped image and or the regional tone-mapped ROI(s).

Graphs 301-314 refer to various possible embodiments and adjustments for regional tone mapping. Various alternative approaches, intermediary steps, and alternative mapping approaches are possible. Graph 301 depicts schematically the original histogram of pixel values in the ROI. Graph 302 shows a pass-through mapping function between the original pixel value (in) to the pixel value (out). The illustrated pass-through function is an identity function and, as such, assigns the same value to the output pixel as that of the input pixel. Graph 303 shows the results of passing histogram shown in graph 301 through the mapping function shown in 302; the result is effectively no change from graph 301.

Graph 304 shows the cumulative transfer function of the histogram (i.e., the integral of the number of pixels in the histogram of graph 302 over the pixel value). This cumulative graph can then be used to determine an optimum method of remapping the pixels so that additional clinically relevant information can be displayed.

For example graph 305 shows the use of threshold functions using an upper threshold level 306 and a lower threshold level 307 to remove extreme highs and lows that might undesirably bias the optimized image. Although upper and lower thresholds are shown, it is contemplated that implementation might only use an upper threshold or might only use a lower threshold.

Pixels having values below the threshold would be mapped to zero intensity (black), and pixels having values above the threshold would be mapped to maximum intensity (white). Pixels having values between the threshold values would initially (i.e., in the global mapping of the same region) have a reduced range of values, but their values would be mapped to cover the full range, or at least a wider range, of grayscale/luminance values available in the displayable dynamic range. As will be described below, mappings can be selected.

Graph 308 shows how the transfer function of the pixel value (in) to the pixel value (out) can be calculated once the appropriate outside-of-threshold information has been removed (i.e., pixels outside the threshold values mapped to black or white). This can be optimized in a number of ways. One way would be a linear map 310. Two non-linear (curved) maps are shown: a map 309 the slope of which has a maximum at the lowest pixel value and decreases for increasing pixel values (i.e., convex looking down); and a map 311 the slope of which has a minimum at the lowest pixel value and increases for increasing pixel values (i.e., concave looking down).

The threshold operations have the effect of providing an increased range of possible output pixel values for the truncated range of input pixel values, and thus provide an overall increase in contrast. This may improve the overall resolution of the image. In some cases, it might be desired to enhance certain regions within an image. For example, curve 309 may be useful for a low intensity echo and curve 311 may be useful to suppress a high intensity echo.

In various embodiments, it might be desired to manipulate certain regions within an image, and non-linear maps 309 and 311 provide examples of how this can be done. Graph 312 shows the result of taking input histogram 301, applying the thresholds of graph 305, and then subjecting the pixel values to non-linear ("convex") transfer map 309. The result is that the lower intensity pixel values are stretched out along the pixel value axis and the higher intensity pixel values are compressed along the pixel value axis. Hence, an image region of lower intensity pixel values (e.g., low intensity echo) is provided a larger range of pixel values, which can enhance detail due to the increased contrast.

Graph 313 shows the result of taking input histogram 301, applying the thresholds of graph 305, and then subjecting the pixel values to linear transfer map 310. The mapping per se does not affect the histogram, but the threshold operation does provide increased overall contrast and maximizes the use of the displayable dynamic range of an electronic display for the selected ROI.

Graph 314 shows the result of taking input histogram 301, applying the thresholds of graph 305, and then subjecting the pixel values to non-linear ("concave") transfer map 311. The result is that the lower intensity pixel values are compressed along the pixel value axis and the higher intensity pixel values are stretched out along the pixel value axis. Hence an image region of higher intensity pixel values (e.g., high intensity echo) is provided a larger range of pixel values, which can enhance detail due to the increased contrast.

Figure 4:
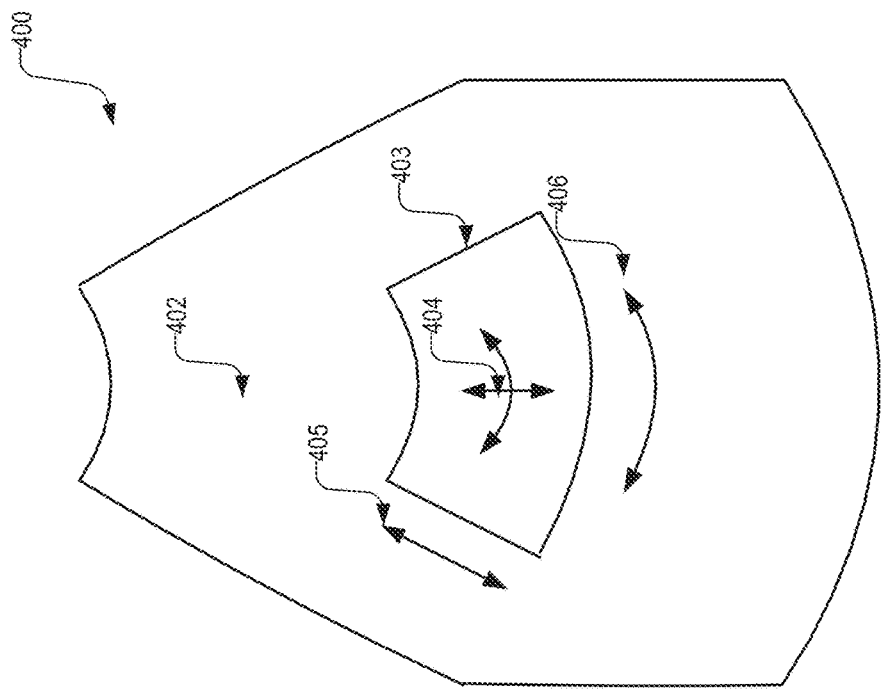
FIG. 4 illustrates one embodiment of an enhanced ROI overlaid on the displayed ultrasound image.
Figure 4:
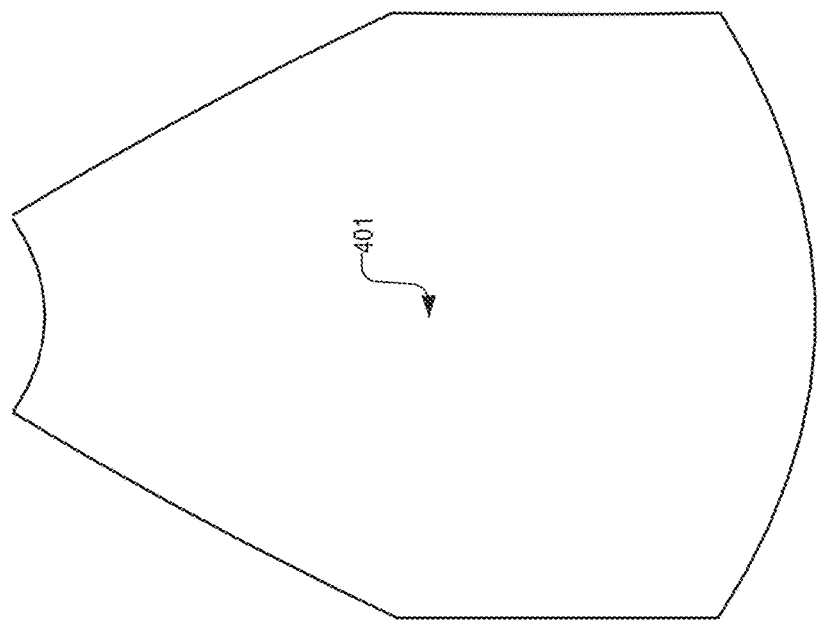

FIG. 4 illustrates one embodiment of a displayed image of an ultrasound image on a display screen 401. In this embodiment, a user display screen 400 is in a dual-image format with images 401 and 402 on the left and right sides, respectively. Image 401 is not enhanced. This non-enhanced image 401 is presented so that the clinician can maintain a reference of what the global dynamic range mapping of the image shows. In some embodiments, image 401 may be omitted.

Image 402 presents similar information to that of image 401 but includes an overlaid ROI 403. ROI 403 is a user-selected ROI where an enhanced or regional tone-mapped image of the selected region can be displayed. The ROI may be resized, as shown by arrows 404; moved up and down, as shown by arrow 405; and moved from side to side, as shown by arrow 406. Upon any change in the ROI 403, the underlying image to be optimized/enhanced via regional tone mapping may be automatically or manually updated to accurately represent the underlying information.

In various embodiments, the ROI may be magnified with respect to the image 402. The magnification amount may be selectively controlled by a user.

Figure 5:
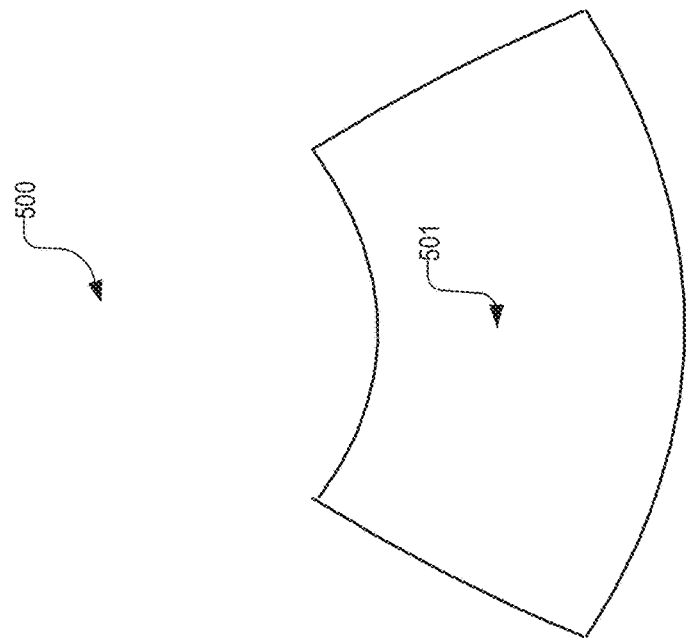
FIG. 5 illustrates the embodiment of the enhanced ROI optionally overlaid on the displayed ultrasound image or displayed in a second separate window.
Figure 5:
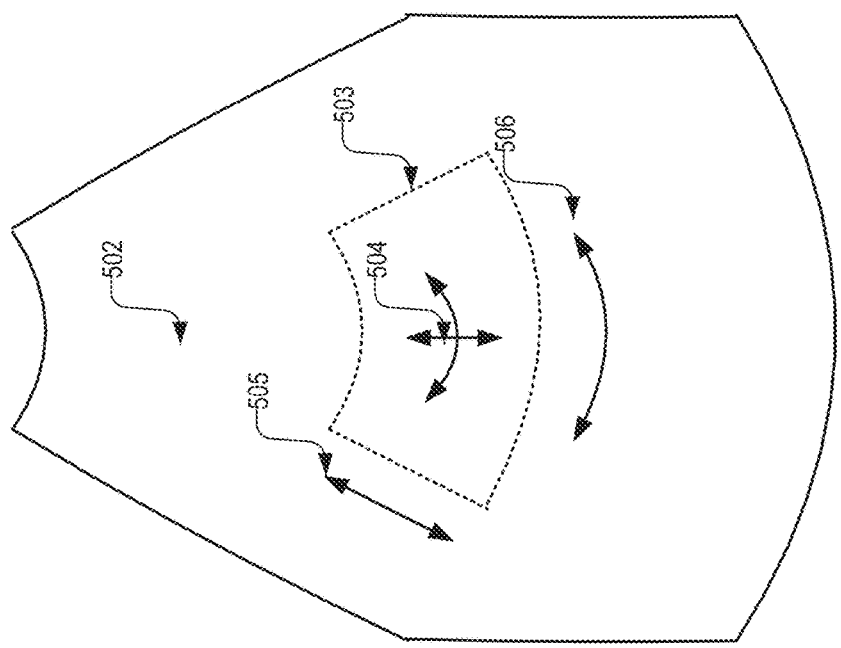

FIG. 5 illustrates the embodiment of the enhanced ROI 503 optionally overlaid on the displayed ultrasound image or displayed in a second separate window 501. In this implementation, as above, a user display screen 500 is in a dual-image format with images 502 and 501. In this implementation, image 501 is a magnified version of a user-selected ROI 503 in image 502. As above, ROI 503 can be varied in response to user controls—it can be resized, as shown by arrows 504; moved up and down, as shown by arrow 505; and moved from side to side, as shown by arrow 506.

ROI 503 can be thought of as a magnifying-glass tool, that is moved over selected portions of image 502, and the magnified version is shown on the right as image 501. The information in ROI 501 is optimized, e.g., via a regional tone mapping, based on the optimum or user-selected mapping function. ROI 503 can be optimized based on the same function as ROI 501 or could be displayed in a non-optimized, or alternatively optimized manner. The illustrated embodiments show ROI 503 confined to an acoustic grid; however, it is appreciated that ROI may be displayed on a Cartesian or another suitable grid instead. In such a case, ROI 501 may be displayed according to the same system/grid or a different coordinate system/grid.

Figure 6B:
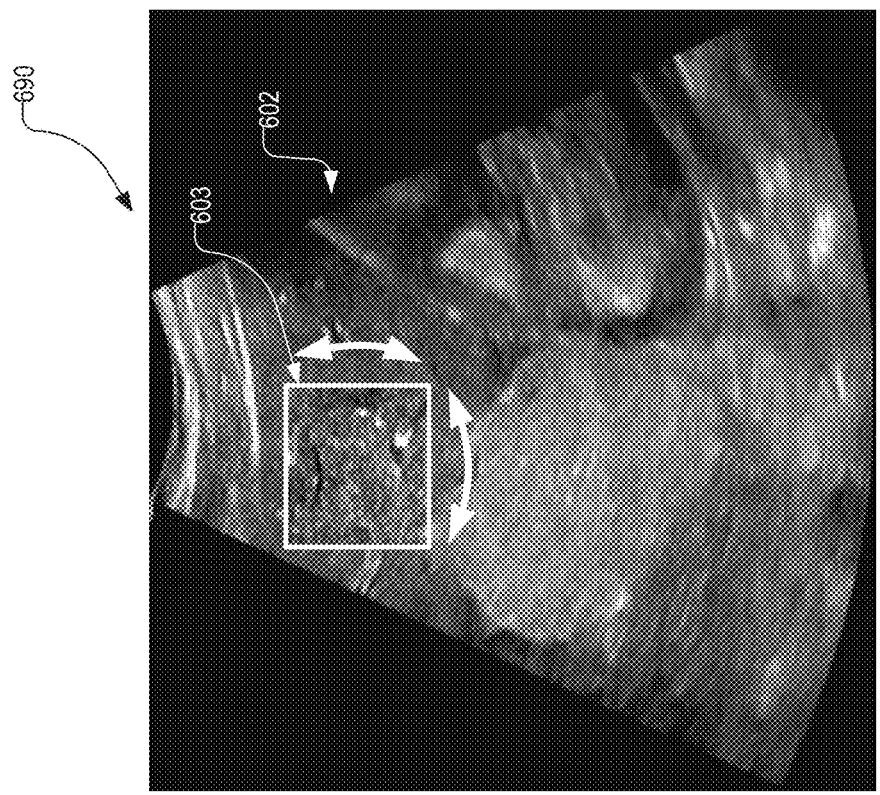
FIGS. 6B and 6D show a screenshot and a representative drawing of the screen shot, respectively, of a user display screen with an enhanced ROI on the ultrasound image of the liver.
Figure 6A:
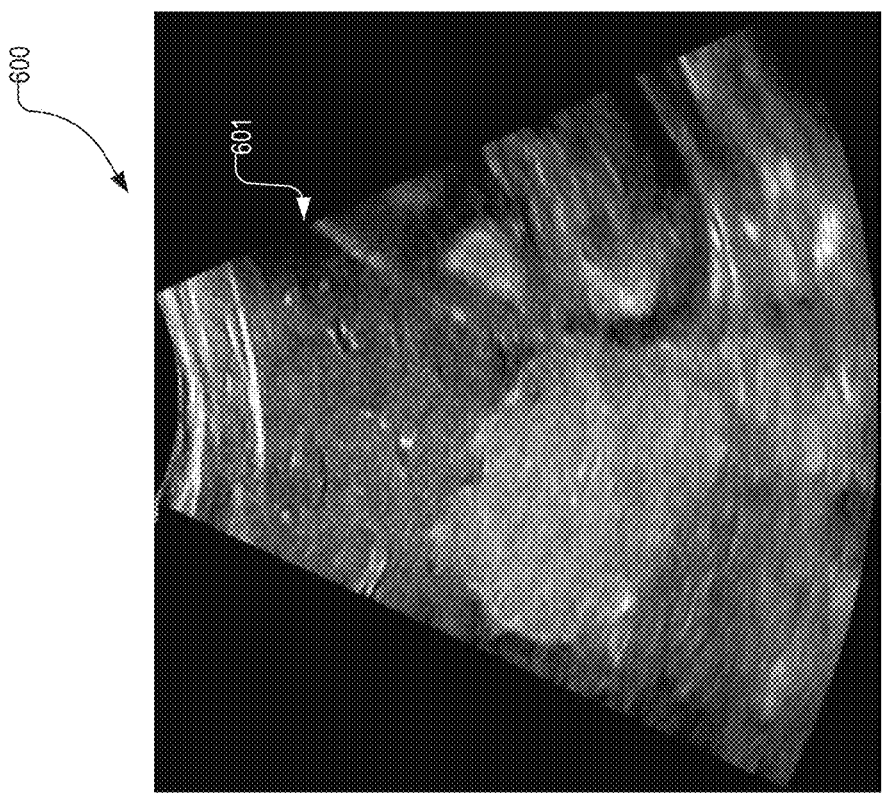
FIGS. 6A and 6C show a screenshot and a representative drawing of the screen shot, respectively, of a user display screen with a displayed ultrasound image that includes a mass within a liver.
Figure 6D:
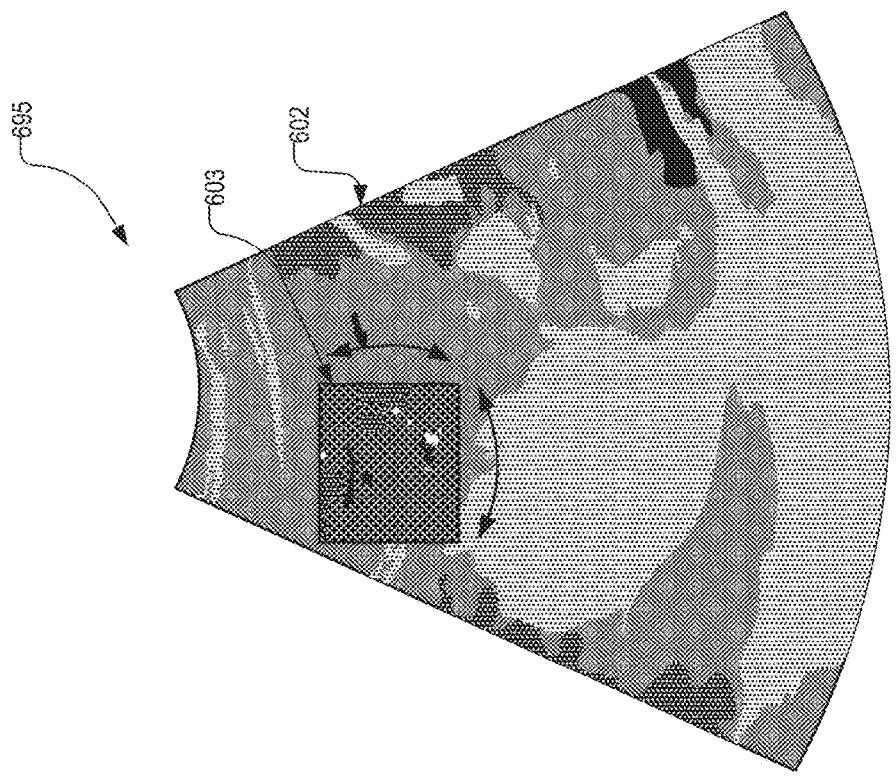
Figure 6C:
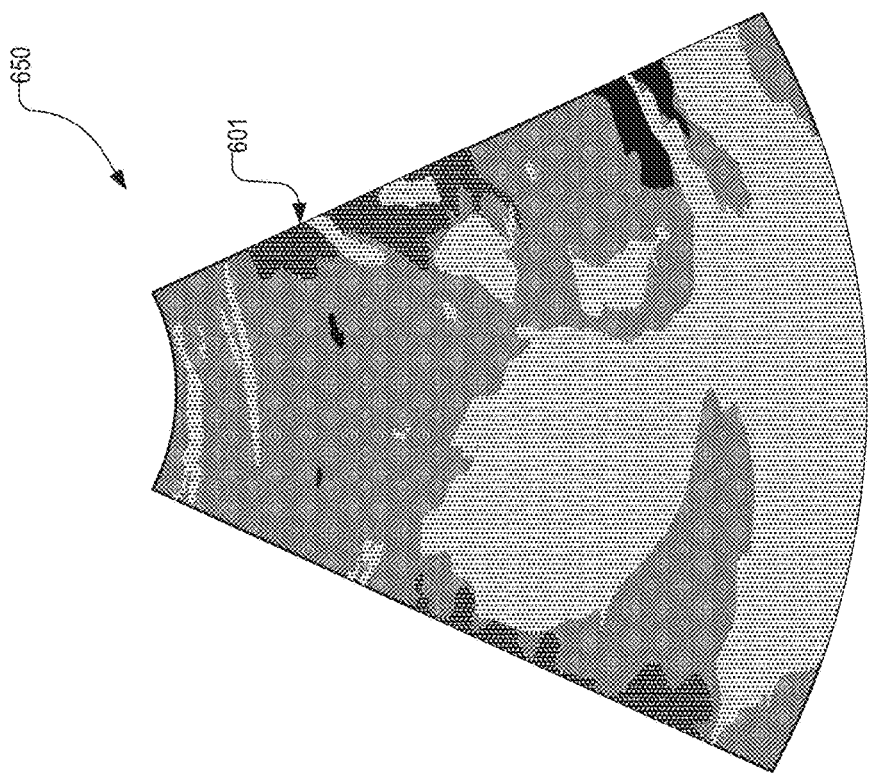

FIGS. 6A and 6C show a screenshot 600 and a representative drawing 650 of the screen shot 600, respectively, of a user display screen with a displayed ultrasound image 601 that includes a mass within a liver. The image 601 is a depiction of an unmodified image.

FIGS. 6B and 6D show a screenshot 690 and a representative drawing 695 of the screen shot 690, respectively, of a user display screen with an enhanced ROI 603 on the ultrasound image 602 of the liver. The displayed ultrasound image, 602, shows an image with an overlaid ROI 603. The image contained within the overlaid ROI 603 is regionally tone mapped to increase the user's ability to distinguish between different features. As illustrated, the globally tone-mapped image 601 makes it difficult to view the discontinuities that clearly visible with the regionally tone-mapped ROI 603. The ROI 603 is capable of being moved as well as resized. The underlying parameters used to perform the regional tone mapping of the ROI 603 may be modified based on a clinician's or other user's preferences.

Figure 7B:
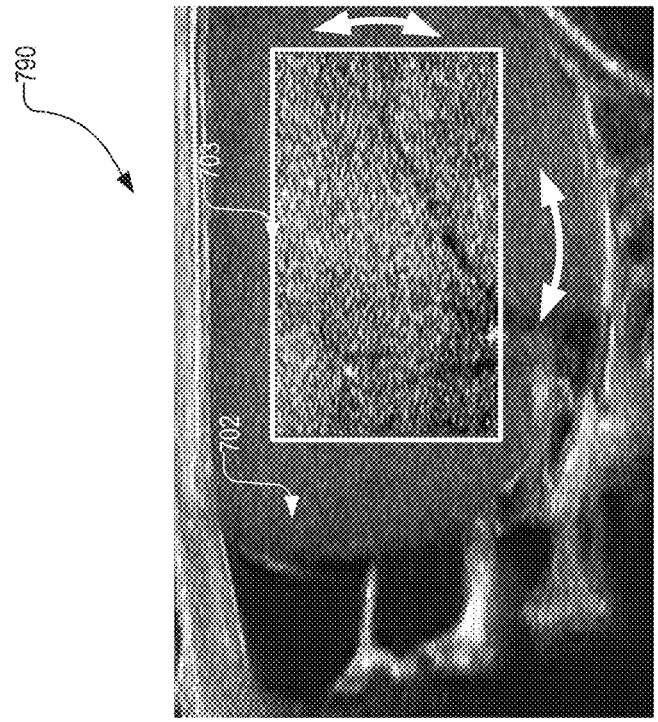
FIGS. 7B and 7D show a screenshot and a representative drawing of the screen shot, respectively, of a user display screen with an enhanced ROI on the ultrasound image of the testicle.
Figure 7A:
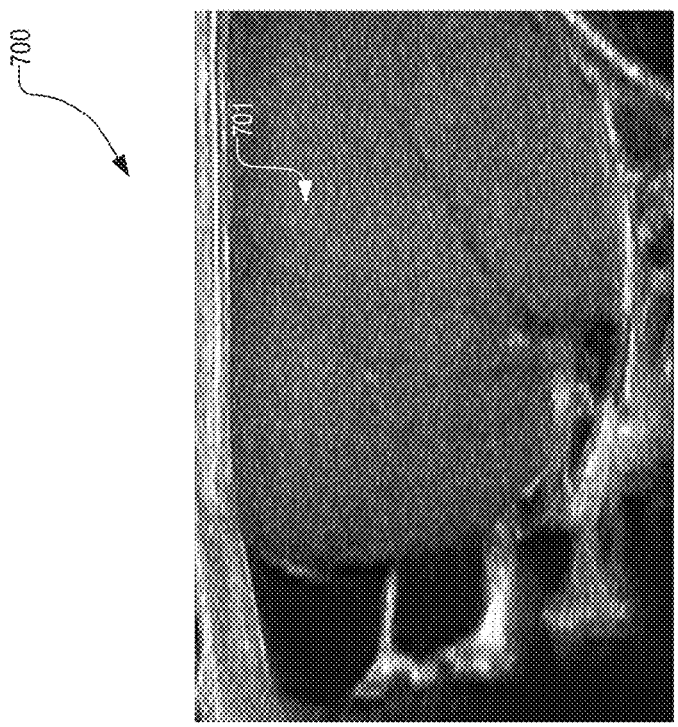
FIGS. 7A and 7C show a screenshot and a representative drawing of the screen shot, respectively, of a user display screen with a displayed ultrasound image of a testicle.
Figure 7D:
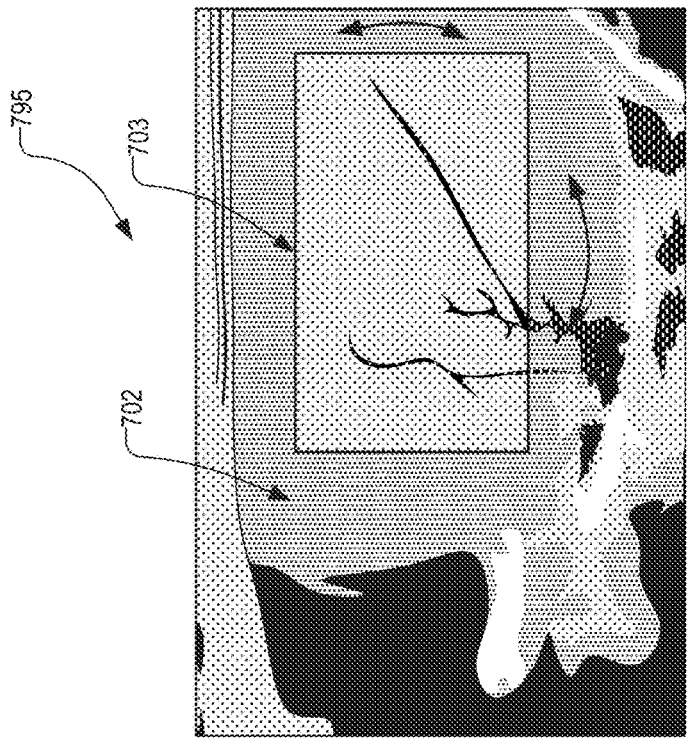
Figure 7C:
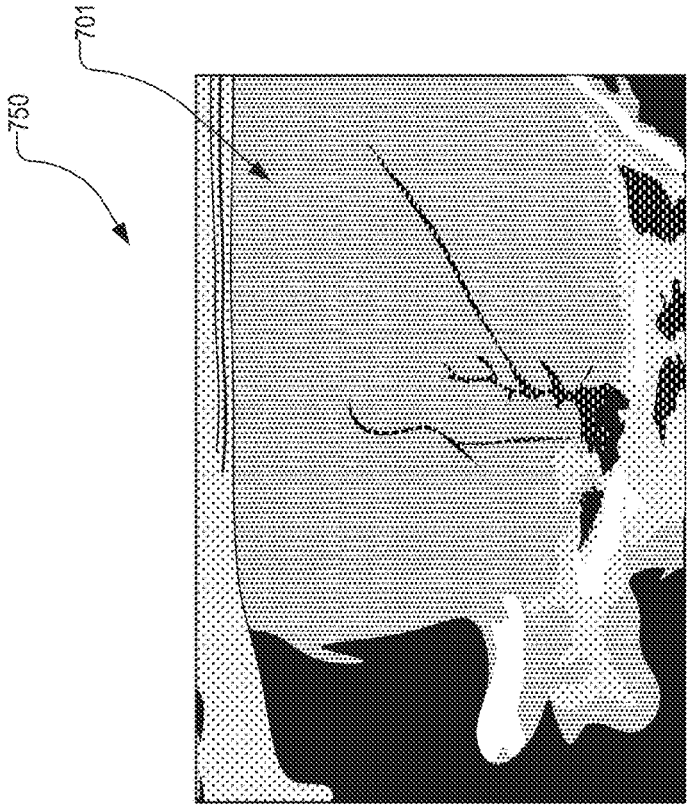

FIGS. 7A and 7C show a screenshot 700 and a representative drawing 750 of the screen shot 700, respectively, of a user display screen with a displayed ultrasound image 701 of a testicle. The image 701 is a depiction of an unmodified image.

FIGS. 7B and 7D show a screenshot 790 and a representative drawing 795 of the screen shot 790, respectively, of a user display screen with an enhanced ROI 703 on the ultrasound image 702 of the testicle. The image 702 shows the ROI 703 overlaid on the image 702. The image contained within the overlaid ROI 703 is regionally tone mapped to depict vessels in a clearer manner than the original globally tone-mapped image 701. The ROI 703 may be moved, resized, and/or magnified. The underlying parameters used to perform the image optimization (e.g., regional tone mapping) may be selected by a clinician or other user via manual controls, via presets, via a curves graph, and/or based on the type of tissue being examined.

Figure 8:
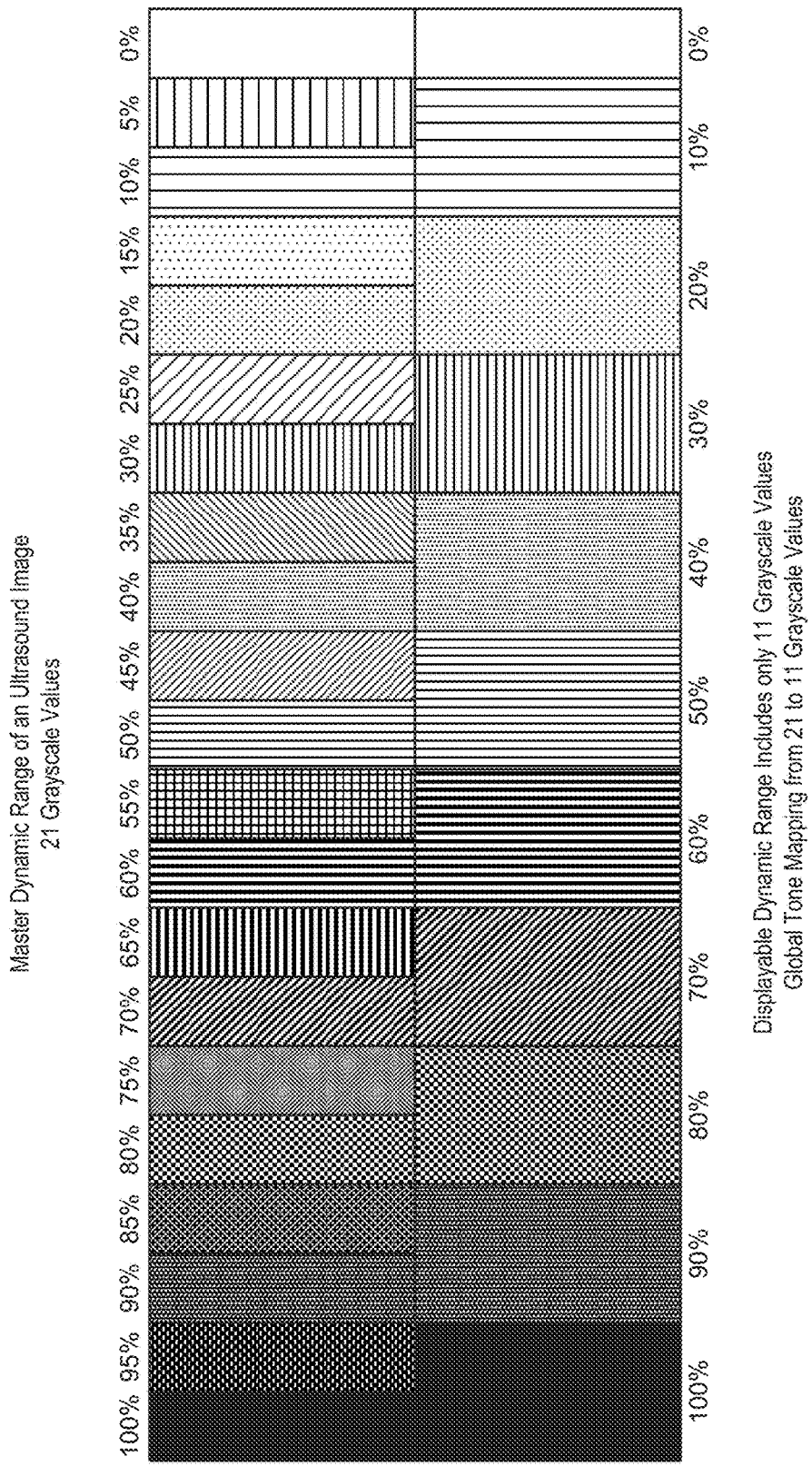
FIG. 8 illustrates a representative global mapping of a master ultrasound image with a wide dynamic range to a displayable dynamic range of an electronic display.

FIGS. 8-13 illustrate various tone mappings, including a global tone mapping in FIG. 8 and various possible regional tone mappings in FIGS. 9-13. It is appreciated that the illustrated examples are merely exemplary and that a nearly infinite number of possible tone mappings may be utilized. In the illustrated embodiments, the grayscale tones are represented using various shading patterns to increase reproducibility. Thus, the shading patterns utilized may be representative of grayscale shades, color shades, hues, shadings, opacities, reflectivity values, and/or other image characteristics.

Additionally, FIGS. 8-13 provide an example in which a master dynamic range of an ultrasound image contains 21 grayscale values (represented by different fill patterns) and a displayable dynamic range of an electronic display contains only 11 grayscale values. It is recognized that the actual dynamic range of the ultrasound images may be in the hundreds of thousands and the displayable dynamic range of the electronic displays may be in the hundreds or even thousands As previously stated, while various references herein refer to ultrasonic image analysis and tone mapping, it is appreciated that any of the various embodiments described herein may be applied to other types of image analysis and process, including numerous medical imaging types.

FIG. 8 illustrates a representative global mapping of a master ultrasound image with a wide dynamic range to a displayable dynamic range of an electronic display. As illustrated, the top row illustrates a master dynamic range of an ultrasound image with 21 grayscale values. The bottom row illustrates a global dynamic mapping of the 21 master grayscale values for display on an electronic display with a dynamic range of 11 grayscale values. As illustrated, the global tone mapping may be nearly a 2:1 compression. In some embodiments, the loss of detail may be significantly worse. For instance, a 16-bit image globally tone mapped for display on an 8-bit electronic display may have a compression ratio of nearly 256:1.

Figure 9:
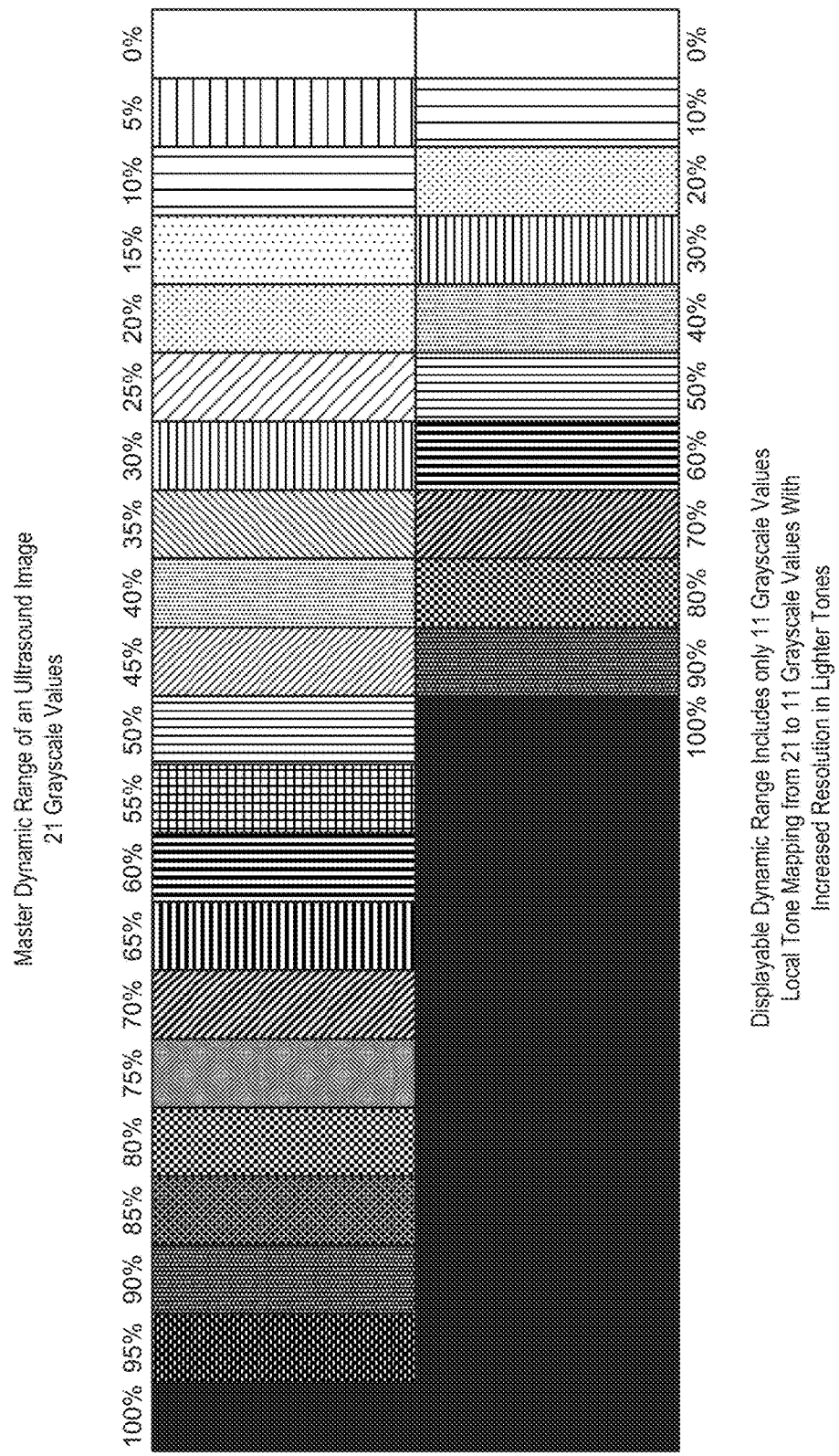
FIG. 9 illustrates one embodiment of a regional mapping of an ROI in which grayscale or luminance values above a threshold value are all mapped to a single grayscale value.

FIG. 9 illustrates one embodiment of a regional mapping of an ROI in which grayscale or luminance values above a threshold value are all mapped to a single grayscale value. Again, the top row illustrates a master dynamic range of an ultrasound image with 21 grayscale values. The bottom row illustrates a regional tone mapping configured to provide increased resolution in the lighter tones. Accordingly, many of the darker tones may be assigned to black (or another dark tone).

Figure 10:
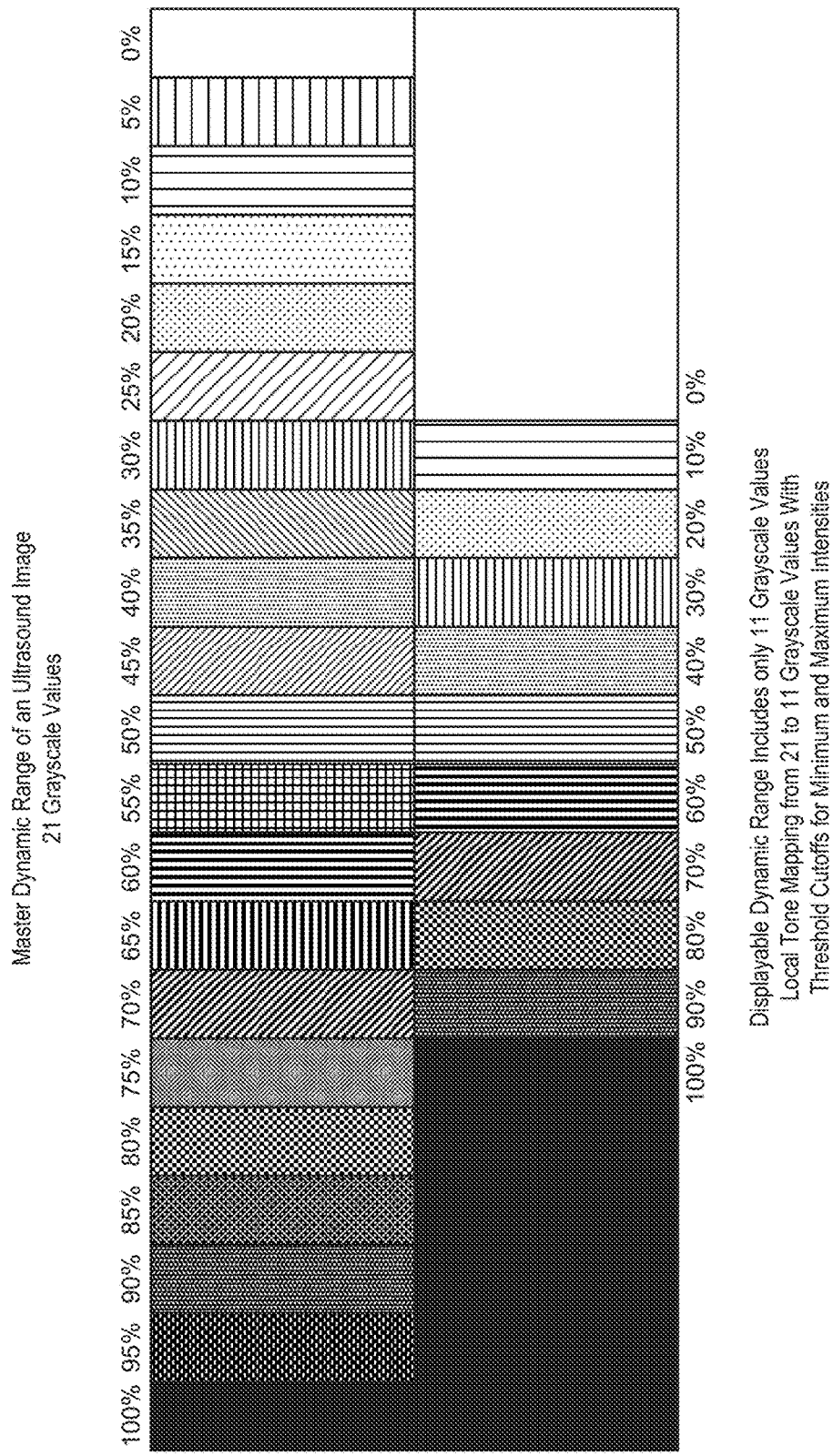
FIG. 10 illustrates one embodiment of a regional mapping of an ROI in which grayscale or luminance values above and below threshold values are combined.

FIG. 10 illustrates one embodiment of a regional mapping of an ROI in which grayscale or luminance values above and below threshold values are combined. Again, the top row illustrates a master dynamic range of an ultrasound image with 21 grayscale values. The bottom row illustrates a regional tone mapping configured to provide increased resolution in the mid-tones. Accordingly, many of the darker tones may be assigned to black (or another dark tone) and many of the lighter tones may be assigned to white (or another light tone).

Figure 11:
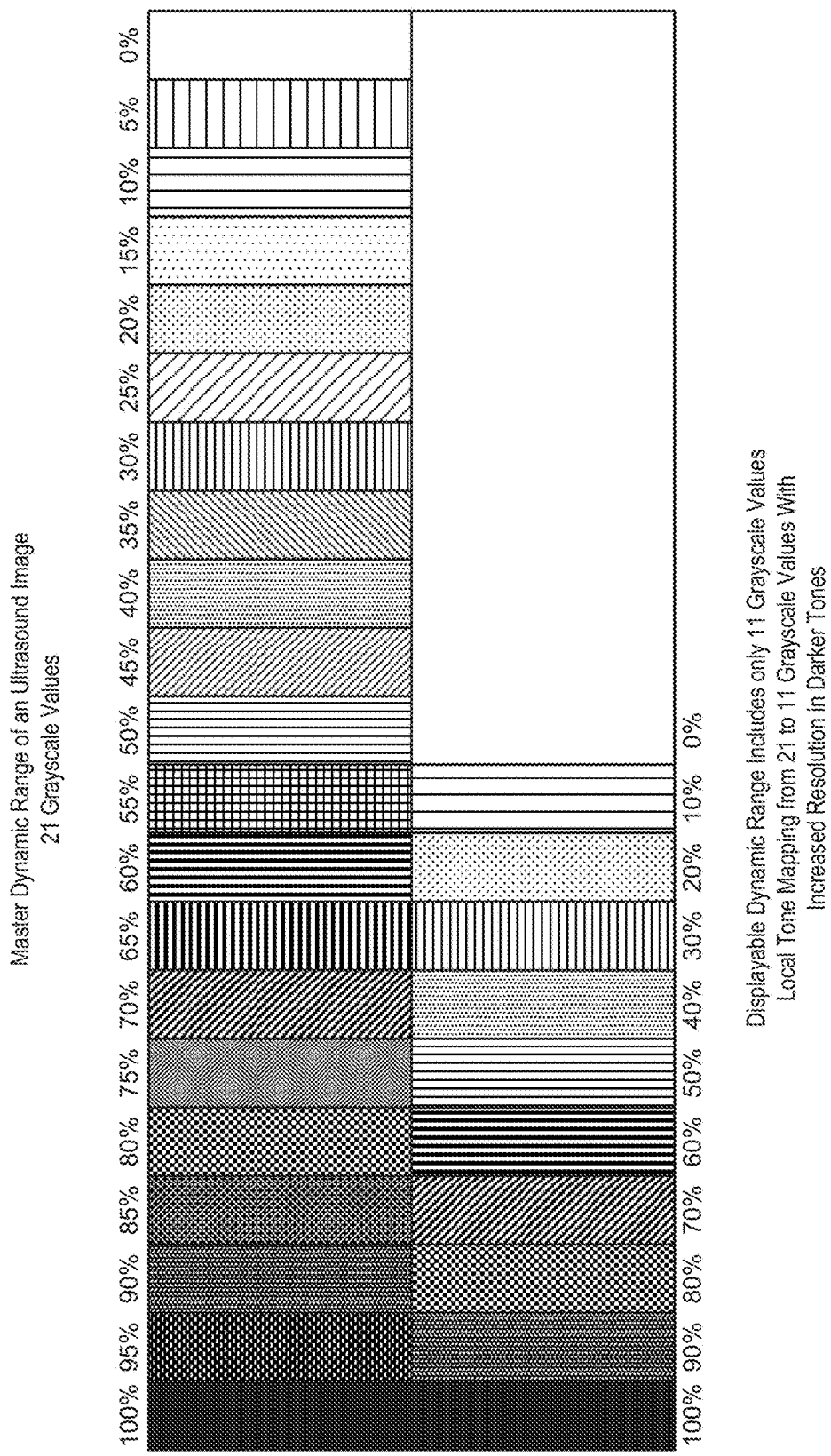
FIG. 11 illustrates one embodiment of a regional mapping of an ROI in which grayscale or luminance values below a threshold value are all mapped to a single grayscale value.

FIG. 11 illustrates one embodiment of a regional mapping of an ROI in which grayscale or luminance values below a threshold value are all mapped to a single grayscale value. Again, the top row illustrates a master dynamic range of an ultrasound image with 21 grayscale values. The bottom row illustrates a regional tone mapping configured to provide increased resolution in the darker tones. Accordingly, many of the lighter tones may be assigned to white (or another light tone).

Figure 12:
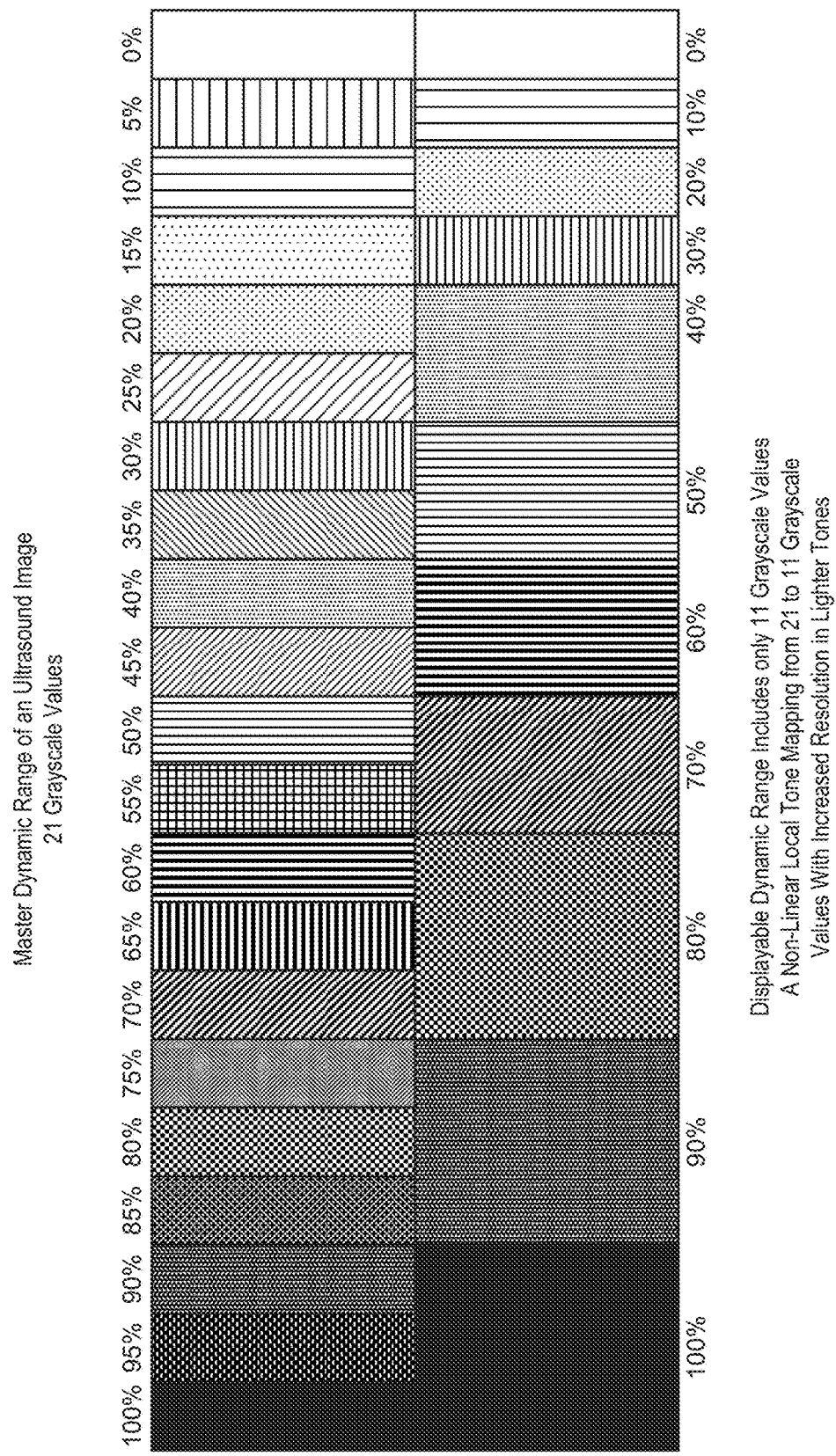
FIG. 12 illustrates one embodiment of a non-linear regional mapping of an ROI with greater resolution for darker shades.

FIG. 12 illustrates one embodiment of a non-linear regional mapping of an ROI with greater resolution for darker shades. Again, the top row illustrates a master dynamic range of an ultrasound image with 21 grayscale values. The bottom row illustrates a non-linear regional tone mapping from 21 to 11 grayscale values with increased resolution in lighter tones.

Figure 13:
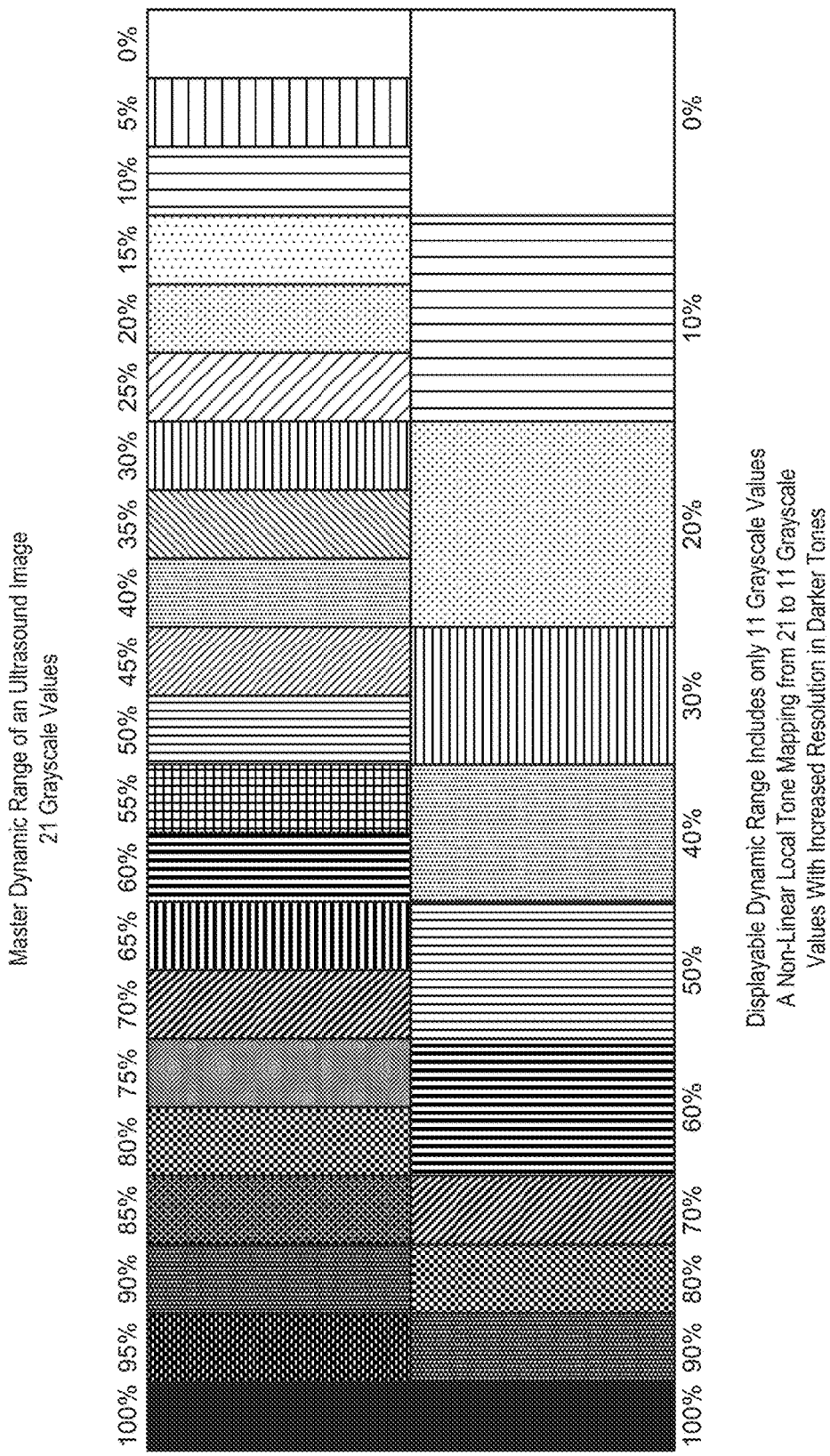
FIG. 13 illustrates one embodiment of a non-linear regional mapping of an ROI with greater resolution for lighter shades.

FIG. 13 illustrates one embodiment of a non-linear regional mapping of an ROI with greater resolution for lighter shades. Again, the top row illustrates a master dynamic range of an ultrasound image with 21 grayscale values. The bottom row illustrates a non-linear regional tone mapping from 21 to 11 grayscale values with increased resolution in the darker tones.

Again, a near infinite number of tone mappings are possible so only a few simplified examples are shown. This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A method comprising:
   receiving, via a processor, ultrasound image data for an ultrasound image that includes a master dynamic range;
   generating a global tone mapping between the ultrasound image data and a displayable dynamic range that is less than the master dynamic range of the ultrasound image;
   receiving, via an electronic input device, information identifying a selected region of the ultrasound image for enhanced tone mapping; and
   displaying a transition between the global tone mapping for the selected region and a regional tone mapping of a subset of the ultrasound image data corresponding to the selected region,
   wherein the regional tone mapping of the selected region of the ultrasound image is different from the global tone mapping of the selected region of the ultrasound image, and
   wherein the regional tone mapping increases a contrast between at least two image elements within the selected region relative to the global tone mapping.

2. The method of claim 1, wherein the ultrasound image comprises a grayscale image, wherein the global tone mapping comprises a global grayscale mapping, and wherein the regional tone mapping comprises a regional grayscale mapping.

3. The method of claim 1, further comprising:
   displaying on an electronic display the global tone mapping of the ultrasound image within the displayable dynamic range; and
   displaying on the electronic display the regional tone mapping of the selected region of the ultrasound image.

4. The method of claim 3, wherein displaying the regional tone mapping of the selected region of the ultrasound image comprises displaying the regional tone mapping of the selected region of the ultrasound image as an overlay on the displayed global tone mapping of the ultrasound image.

5. The method of claim 4, wherein the overlaid regional tone mapping of the selected region is magnified on the electronic display with respect to the displayed global tone mapping of the selected region.

6. The method of claim 1, wherein the dynamic range of the regional tone mapping of the selected region of the ultrasound image is larger than the dynamic range of the selected region in the global tone mapping.

7. The method of claim 1, wherein the regional tone mapping and the global tone mapping both comprise linear tone mappings of the ultrasound image data; and wherein, with respect to a grayscale spectrum of the ultrasound image data, the regional tone mapping of the selected region is shifted with respect to the global tone mapping of the same region.

8. The method of claim 1, wherein generating the regional tone mapping of the ultrasound image comprises a function comprising one or more of: a linear mapping function, a gamma compression algorithm, a gradient domain high dynamic range compression algorithm, a gamma algorithm, a logarithmic algorithm, a histogram equalization algorithm, a tone mapping algorithm that is different from the global tone mapping algorithm, a decomposition of the image, a gradient of the image, an inverse tone mapping algorithm, an inverse linearization algorithm, and an image color appearance model (iCAM).

9. The method of claim 1, wherein generating the regional tone mapping of the ultrasound image comprises disregarding luminance values of the ultrasound image data that are below a minimum threshold value and luminance values of the ultrasound image data that are above a maximum threshold value.

10. The method of claim 1, wherein receiving the information identifying the selected region comprises receiving an input from a user relative to a portion of the ultrasound image displayed on an electronic display.

11. The method of claim 1, wherein receiving the information identifying the selected region comprises receiving information identifying a region potentially associated with a vascular structure.

12. The method of claim 1, wherein receiving the information identifying the selected region comprises receiving information identifying a region potentially associated with a boundary of two or more dissimilar tissues.

13. The method of claim 1, wherein generating the regional tone mapping of the selected region comprises a tone mapping based on one of a user-selected preset and a user-selected image adjustment.

14. A method comprising:
   displaying, via an electronic display, a global tone mapping of an ultrasound image;
   receiving, via an electronic input device, a selection of a region of interest within the displayed ultrasound image; and
   displaying, via the electronic display, a transition between the global tone mapping for the region of interest and a regional tone mapping for the region of interest, wherein the regional tone mapping of the region of interest is different from the global tone mapping of the same region of interest.

15. The method of claim 14, further comprising:
   displaying the regional tone mapping of the region of interest as an overlay on the displayed global tone mapping of the ultrasound image.

16. The method of claim 14, further comprising:
   receiving one or more tone mapping parameters from a user, and
   wherein the regional tone mapping of the region of interest is based on the one or more received tone mapping parameters.

17. The method of claim 14, further comprising:
   receiving a user selection of a tone mapping preset from a plurality of available tone mapping presets, and
   displaying the region of interest according to the selected tone mapping preset.

18. The method of claim 17, wherein the plurality of available tone mapping presets comprises one or more tone mapping presets configured for viewing ultrasound images associated with at least one of a liver, a kidney, a breast, a testicle, a vascular structure, and junction of two or more tissue types.

19. The method of claim 14, further comprising:
adjusting one of the size and relative location of the region of interest; and
displaying a refreshed regional tone mapping of the region of interest based on the adjusted region of interest.

20. The method of claim 19, wherein displaying the refreshed regional tone mapping of the region of interest comprises gradually transitioning the displayed region of interested from an initial regional tone mapping to the refreshed regional tone mapping.

21. The method of claim 14, further comprising:
displaying the regional tone mapping of the region of interest magnified with respect to the displayed global tone mapping of the same region of interest.

22. The method of claim 14, wherein the region of interest is defined as an acoustic grid relative to the displayed global tone mapping of the ultrasound image.

23. The method of claim 14, wherein the region of interest corresponds to a region associated with one of a vascular structure and dissimilar tissues.

24. The method of claim 14, wherein the regional tone mapping of the region of interest has a larger dynamic range than the global tone mapping of the region of interest.

25. The method of claim 14, wherein the regional tone mapping comprises one or more of: a linear mapping function, a gamma compression algorithm, a gradient domain high dynamic range compression algorithm, a gamma algorithm, a logarithmic algorithm, a histogram equalization algorithm, a tone mapping algorithm different from the global tone mapping algorithm, a decomposition of the image, a gradient of the image, an inverse tone mapping algorithm, an inverse linearization algorithm, and an image color appearance model (iCAM).

26. The method of claim 14, further comprising:
setting luminance values that correspond to the ultrasound image data for the region of interest and that are below a minimum threshold value to a black equivalence.

27. The method of claim 14, further comprising:
setting luminance values that correspond to the ultrasound image data for the region of interest and that are above a maximum threshold value to a white equivalence.

* * * * *